(12) United States Patent
Mirfakhraei et al.

(10) Patent No.: US 11,159,970 B2
(45) Date of Patent: Oct. 26, 2021

(54) MULTI-BAND COMPRESSED SPATIO-TEMPORAL LOGGING OF RADIO FREQUENCY (RF) TELEMETRY DATA

(71) Applicant: Cisco Technology, Inc., San Jose, CA (US)

(72) Inventors: Khashayar Mirfakhraei, Los Altos, CA (US); Xu Zhang, Fremont, CA (US); Ardalan Alizadeh, San Jose, CA (US); Amir Hosein Kamalizad, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 16/299,481

(22) Filed: Mar. 12, 2019

(65) Prior Publication Data
US 2020/0296611 A1  Sep. 17, 2020

(51) Int. Cl.
*H04W 24/10* (2009.01)
*H04W 72/10* (2009.01)
*H04W 24/08* (2009.01)
*H04W 72/04* (2009.01)
*H04W 72/12* (2009.01)

(52) U.S. Cl.
CPC .......... *H04W 24/10* (2013.01); *H04W 24/08* (2013.01); *H04W 72/0446* (2013.01); *H04W 72/0453* (2013.01); *H04W 72/1263* (2013.01)

(58) Field of Classification Search
CPC . H04W 24/10; H04W 24/08; H04W 72/0446; H04W 72/0453; H04W 72/1263
See application file for complete search history.

(56) References Cited

U.S. PATENT DOCUMENTS

| | | | |
|---|---|---|---|
| 7,610,036 B2 | 10/2009 | Teo et al. | |
| 8,515,473 B2 | 8/2013 | Mody et al. | |
| 9,363,679 B2 | 6/2016 | Giannakis et al. | |
| 9,525,204 B2 | 12/2016 | O'Keeffe et al. | |
| 9,660,693 B1 | 5/2017 | Ni et al. | |
| 2018/0213348 A1* | 7/2018 | Natarajan | H04W 4/38 |

OTHER PUBLICATIONS

Awe, O.P., et al, "Spatio-Temporal Spectrum Sensing in Cognitive Radio Networks Using Beamformer-Aided SVM Algorithms," IEEE *Access*, vol. 6, 2018, pp. 25377-25388.
(Continued)

*Primary Examiner* — Natasha W Cosme
(74) *Attorney, Agent, or Firm* — Meunier Carlin & Curfman LLC (57) ABSTRACT

In one embodiment, an apparatus comprises a compressive sensing schedule generator configured to generate a plurality of compressive sensing schedules, wherein each of the plurality of compressive sensing schedules is for each of a plurality of frequency bands of a network, wherein the network comprises a plurality of access points and a plurality of clients, and a sensing matrix combiner configured to combine the plurality of compressive sensing schedules into a resulting schedule that comprises a spatial distribution and a scheduled time slot for each of the plurality of access points.

15 Claims, 8 Drawing Sheets

(56) References Cited

OTHER PUBLICATIONS

Bazerque, J.A., et al., "Distributed Spectrum Sensing for Cognitive Radio Networks by Exploiting Sparsity," IEEE Transactions on Signal Processing, vol. 58, No. 3, 2010, pp. 1847-1862.
Duarte, M.F., et al., "Distributed Compressed Sensing of Jointly Sparse Signals," IEEE, Proceedings of the 2005 Asilomar Conference on Signals, Systems, and Computers, Oct. 30-Nov. 2, 2005, 5 pages.
Duarte, M.F., et al., "Kronecker Product Matrices for Compressive Sensing," IEEE 2010 International Conference on Acoustics, Speech, and Signal Processing (ICASSP 2010), Mar. 14-19, 2010, 4 pages.
Duarte, M.F., et al., "Spectral Compressive Sensing," Applied and Computational Harmonic Analysis, vol. 35, No. 1, 2013, pp. 111-129.
Kim, S-J., et al., "Cognitive Radio Spectrum Prediction Using Dictionary Learning," 2013 IEEE Global Communications Conference, GLOBECOM 2013, 6 pages.
Meena, V. et al., "Noise Resilient Recovery Algorithm for Compressed Sensing," arXiv:14125344v1 [cs.IT], 2014, 31 pages.
Needell, D., et al., "COSAMP: Iterative Signal Recovery From Incomplete and Inaccurate Samples," arXiv:0803.2392v2 [math.NA], Apr. 17, 2008 (initially presented at Information Theory and Applications in San Diego on Jan. 31, 2008), 30 pages.
Qaisar, S., et al., "Compressive Sensing: From Theory to Applications, a Survey," Journal of Communications and Networks, vol. 15, No. 5, 2013, pp. 443-456.
Qi, H., et al., "Two-Dimensional Compressive Spectrum Sensing in Collaborative Cognitive Radio Networks," 2017 IEEE Global Communications Conference, GLOBECOM 2017, 6 pages.
Shi, L., et al., "Beyond Sensing: Multi-GHz Realtime Spectrum Analytics," $12^{th}$ USENIX Symposium on Networked Systems Design and Implementation (NSDI '15), 2015, pp. 159-172.

\* cited by examiner

MULTI-BAND COMPRESSED SPATIO-TEMPORAL LOGGING OF RADIO FREQUENCY (RF) TELEMETRY DATA

BACKGROUND

The present disclosure relates generally to wireless networks and communication systems.

BACKGROUND

In many networks, a spatial map of signal or interference radio frequency (RF) strength as well as other RF statistics (e.g., SNR (signal to noise ratio), RSSI (received signal strength indicator), MCS (modulation and coding scheme), throughput, and packet retry/retransmit rate, within an operational frequency band are of interest to the network operator and/or network management. Another point of interest is the chronic evolution of such a spatial map. The data can then be logged under the RF statistics within a network monitoring, management, and automation entity (e.g., a digital network architecture center (DNAC) entity) for further analysis and diagnostic purposes. There are many overheads associated with such statistics gathering.

For example, many transmitting nodes may have to act as dedicated and agnostic receivers and/or sensors to gather the data, thereby reducing the network's capacity for the duration of the sensing. An alternative is to deploy redundant transceiver nodes in the network, which incurs additional cost to the network planner.

Additionally, the gathered data needs to be communicated to fusion nodes that have upstream transport capability to the cloud (e.g., the network monitoring, management, and automation entity), thereby adding to the diagnostic data traffic to the detriment of payload capacity of the network. Also, the fusion nodes need to communicate the data upstream to the network monitoring, management, and automation entity in the cloud, adding to the congestion of the upstream link from the network to the cloud.

Moreover, in green networks where power allocation and complexity and cost of the sensor and fusion nodes (memory associated with temporarily storing RF statistics before upstream transport) is constrained, the sensing and communication overhead due to the RF statistics measurements and communication may add considerably to the power consumed by each node and the cost associated with it.

Therefore, it is desirable to gather, store, and transport the information with as few data points as possible to conserve network resources.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an implementation, an apparatus is provided that may include a compressive sensing schedule generator configured to generate a plurality of compressive sensing schedules, wherein each of the plurality of compressive sensing schedules is for each of a plurality of frequency bands of a network, wherein the network comprises a plurality of access points and a plurality of clients, and a sensing matrix combiner configured to combine the plurality of compressive sensing schedules into a resulting schedule that comprises a spatial distribution and a scheduled time slot for each of the plurality of access points.

In an implementation, a method is provided that may include generating, at a compressive sensing schedule generator of a management entity, a plurality of compressive sensing schedules, wherein each of the plurality of compressive sensing schedules is for each of a plurality of frequency bands of a network, wherein the network comprises a plurality of access points and a plurality of clients, combining, at a sensing matrix combiner of the management entity, the plurality of compressive sensing schedules into a resulting schedule that comprises a spatial distribution and a scheduled time slot for each of the plurality of access points, and gathering, by the management entity, a plurality of radio frequency (RF) statistics from the network using the resulting schedule.

In an implementation, a method is provided that may include monitoring a plurality of frequency bands of a network for a plurality of non-compressed radio frequency (RF) statistics, estimating a configuration for the network using the non-compressed RF statistics, gathering compressed data from the network using the configuration, recovering a map of RF statistics across the network using the compressed data, and performing at least one of diagnostics or configuration of the network based on the map.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 1:
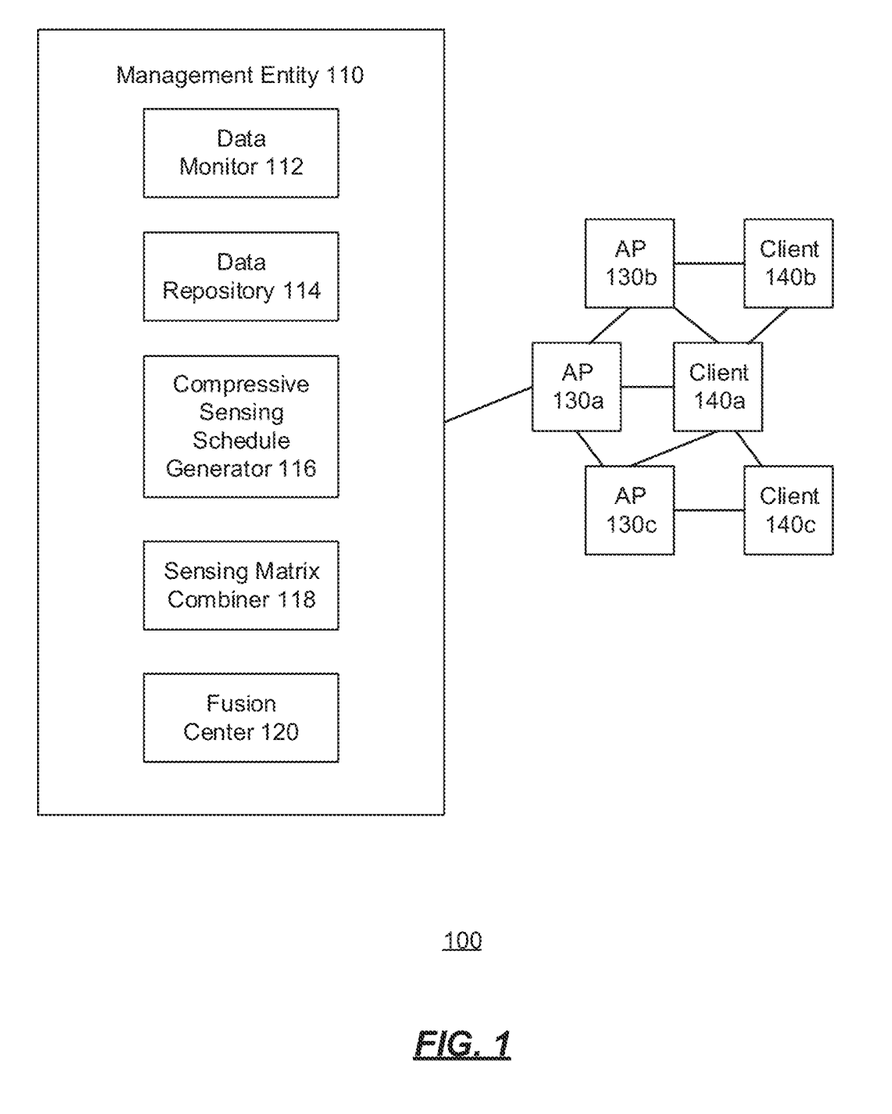
FIG. 1 is an illustration of an exemplary environment for multiband compressive sensing.

FIG. 1 is an illustration of an exemplary environment 100 for multiband compressive sensing. The environment comprises a management entity 110, one or more central stations referred to as access points (APs) 130, shown as APs 130a, 130b, and 130c, and one or more stations referred to as clients 140, shown as clients 140a, 140b, and 140c. In the environment 100, which may be a local area network under 802.11, clients 140a, 140b, 140c, wirelessly communicate. In an implementation, the clients 140a, 140b, 140c, are associated with one or more APs 130a, 130b, 130c. In some implementations, each of the APs 130a, 130b, 130c may comprise a controller and/or a network monitoring, management, and automation entity such as a digital network architecture center (DNAC) system. In some implementations, one or more of the APs may share a controller and/or a network monitoring, management, and automation entity. Alternatively, each AP may comprise or be associated with its own controller and/or network monitoring, management, and automation entity.

The management entity 110, the APs 130, and the clients 140 are operably connected to one or more networks, such as a LAN (local area network), a WAN (wide area network), etc. Although only three APs 130 are shown, and only three clients 140 are shown, this is not intended to be limiting, and any number of clients and access points may be used depending on the implementation.

Each of the APs 130 and each of the clients 140 may be any type of device with functionality for connecting to a WiFi network such as a computer, smart phone, or a UE (user equipment) with WLAN (wireless LAN) access capability, such as terminals in a LTE (Long Term Evolution) network. Depending on the implementation, each AP 130 may comprise any type of access point including a router, for example. Each of the clients 140 may comprise any type of wireless station or receiver device, for example.

Figure 9:
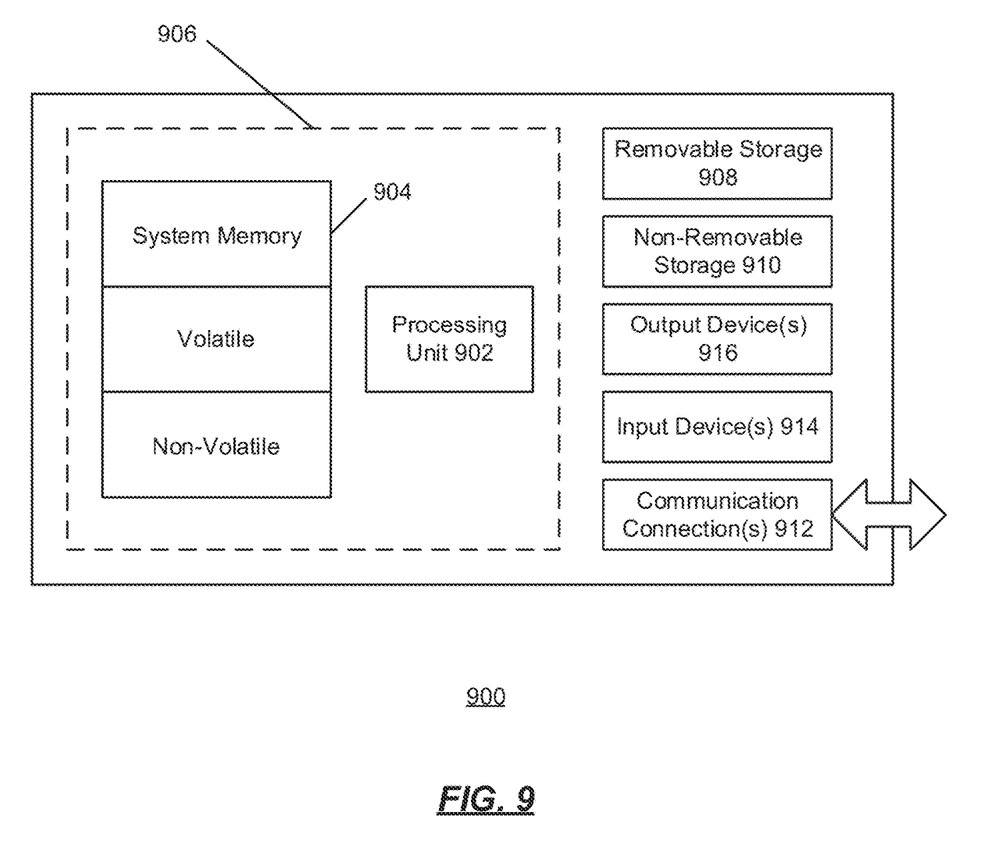
FIG. 9 shows an exemplary computing environment in which example embodiments and aspects may be implemented.

The APs 130 and the clients 140 may be implemented using a variety of computing devices such as smartphones, desktop computers, laptop computers, tablets, set top boxes, vehicle navigation systems, and video game consoles. Other types of computing devices may be supported. A suitable computing device for use as a client or as an AP is illustrated in FIG. 9 as the computing device 900. The example embodiments described herein refer to the Institute of Electrical and Electronics Engineers (IEEE) 802.11 standards; however, these examples are provided in order to employ well defined terminology for ease of description, and the principles described herein may be applied to any suitable protocol that provides traffic such as multicast streams as described herein.

Each of the APs 130 comprises an RF (radio frequency) transceiver (transmitter-receiver) and processing circuitry that includes the functionalities for WiFi network access via the RF transceiver as well as other functionalities for processing described herein. Each of the client devices 140 also includes an RF transceiver and processing circuitry. The RF transceivers may each incorporate one or more antennas.

Figure 2:
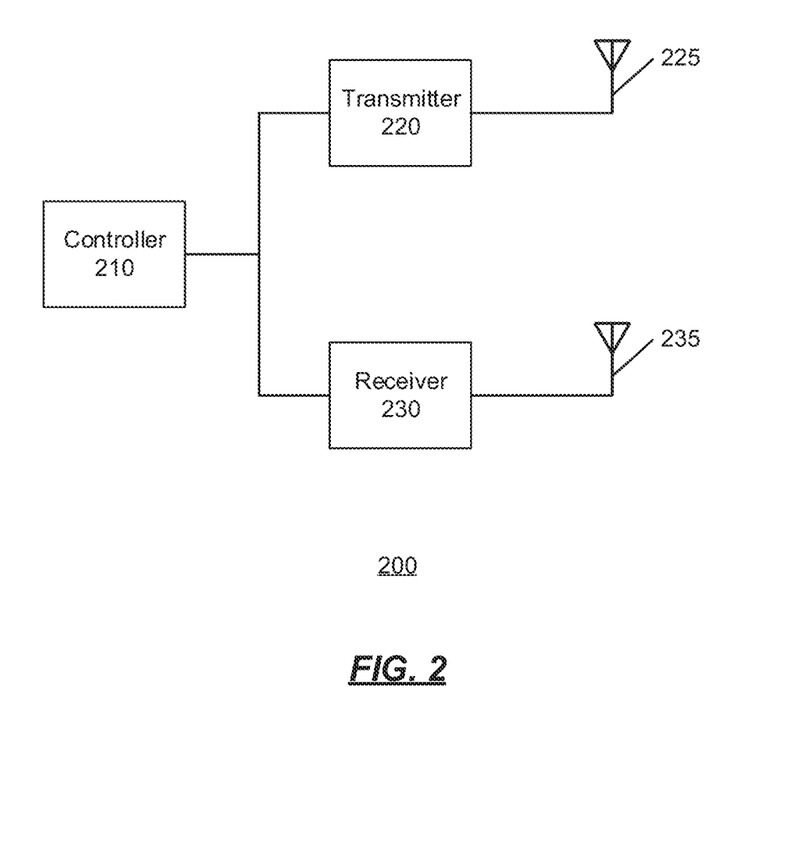
FIG. 2 is a block diagram illustrating an example of a networked device operable in accordance with an example embodiment.

More particularly, FIG. 2 is a block diagram illustrating an example of a networked device 200, such as an access point, operable in accordance with an example embodiment. The networked device 200 is suitable to provide the functionality described herein for each of the APs 130, for example. The networked device 200 comprises a transmitter 220 for sending data, a receiver 230 for receiving data, and a controller 210 coupled with the transmitter 220 and the receiver 230 and operable to send and receive data via the transmitter 220 and the receiver 230, respectively. In FIG. 2, the transmitter 220 is coupled to an antenna 225 while the receiver 230 is coupled to an antenna 235; however, those skilled in the art can readily appreciate that the transmitter 220 and the receiver 230 can be coupled to a common antenna.

In an example embodiment, the controller 210 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), system on a chip (SoC), programmable system on a chip (PSOC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

There are several categories of compressive spectrum sensing, including cognitive radio spectrum sensing in two dimensions (frequency and space). In this category by frequency, sub-nyquist sampling is implied in order to capture the information regarding the spectrum. It is noted that the framework and techniques described herein do not assume sparsity in frequency, as implementations herein look at specific sub-bands of interest, and implementations herein use the temporal gradation of the spectrum and other RF statistics in compressed measurement techniques.

Well known studies and techniques focus on using machine or dictionary learning in order to make predictions or fill in missing data in a spectral sensing regime. Temporal sensing, alone or with spatial aspects, often uses machine or dictionary learning to make predictions or fill in the missing data in a spectral sensing regime. One conventional technique uses an off-the-shelf dictionary learning and sparse coding mechanism to infer the spatial and temporal attributes of the interference spectrum. It uses sparse coding using the learnt dictionary to measure the data. However, it is noted that the framework and techniques described herein do not rely on or use machine or dictionary learning to achieve compression.

As described further herein, compressive sensing based on statistical analysis of spectral/RF statistics data which is captured over time is used to generate a deterministic measurement matrix. Two-dimensional (2D) compressive sensing algorithms are used to determine the measurement matrix for the per-band sensing. Erasure recovery (missing data recovery) may be used in the compressive sensing to provide protection against anomalies or missed opportunities to sense by one of the transceivers. In some implementations, the erasure recovery (missing data recovery) attributes of OAMP (operations, administration, maintenance, and provisioning) recovery algorithms may be used in compressive sensing to provide protection against anomalies or missed opportunities to sense by one of the transceivers.

In some implementations, a multi-band joint spatio-temporal compressive sensing framework is provided. The three dimensions (frequency, time, and space) are considered. As described further herein, the spectrum sensing requirements are met while using as few resources as possible, by instructing multiple APs to go to different frequency bands in different time slots according to a computed compressive sensing schedule, also referred to as a measurement matrix. The multi-band spatio-temporal compressive sensing dramatically reduces the volume of RF related data gathered and communicated, while recovering the desired information at the management entity whether collocated with the network or in the cloud.

As further described, a framework and methods (e.g., resource saving oriented and erasure avoidance oriented) are provided that address joint spatio-temporally compressed telemetry data collection in multiple frequency bands that can be designed for different system requirements. First, a compressive sensing schedule (i.e., measurement matrix) of each frequency band is computed separately. Next, a flexible combining process generates the composite sensing schedule (measurement matrix) across multiple bands. Thus, a framework is provided with which one can compile telemetry information while realizing considerable savings in network resources.

Returning to FIG. 1, the management entity 110 comprises a data monitor 112, a data repository 114, a compressive sensing schedule generator 116, a sensing matrix combiner 118, and a fusion center 120.

The data monitor 112 gathers RF statistics from the network, such as a frequency band of a scan, a time of a scan, and the nodes configured to scan. The data repository 114 receives and stores the RF statistics. The compressive sensing schedule generator 116 uses the RF statistics to compute compressive sensing schedules (e.g., in the form of matrices referred to as measurement matrices).

The sensing matrix combiner 118 combines the compressive sensing schedules of the different frequency bands, and the fusion center 120 reconstructs sensing schedules (e.g., in the form of matrices) after additional sensing, as described further herein. It is contemplated that the fusion center and the management entity may be two distinct entities or may be comprised within one physical entity, depending on the implementation.

Compressive sensing is an emerging technology in the field of signal processing. In two-dimensional compression and measurement (compressive sensing), the joint sparsity of the two-dimensional data is considered in deriving a measurement matrix and recovery algorithms. In compressive sampling, as is well known, when data is sparse and compressible, a condensed representation can be acquired with little or no information loss through $y=\phi x$ linear dimensionality reduction.

Central to the choice for the measurement matrix of a compressive sensing schedule is the well known restricted isometry property (RIP). RIP is useful in the choice of the measurement matrix $\phi$ that may be used as a compressive sensing schedule. The structure of sparse/compressible signals is preserved (here K is the cardinality of the signals $x_1$ and $x_2$ in an orthogonal basis set, where typically $2K \leq M << N$).

RIP of the order 2K implies: for all K-sparse $x_1$ and $x_2$, where $\delta_{2K}$ corresponds to the smallest positive number such that $$(1 - \delta_{2K}) \leq \frac{\|\Phi x_1 - \Phi x_2\|_2^2}{\|x_1 - x_2\|_2^2} \leq (1 + \delta_{2K}).$$

RIP ensures that $\|x_1 - x_2\|_2 \approx \|\phi_1 - \phi_2\|_2$.

The choice of M and $\delta_{2K}$, when designing a measurement matrix, enables full (N nodes) data recovery with varying quality (Signal to Recovery Noise), and robustness against erasures. Two known methods that describe joint two-dimensional compressive sensing are Kronecker compressive sensing and distributed compressive sensing, outlining a systematic way of obtaining the measurement matrix. There is also a tradeoff in choice of M and $\delta_{2K}$ with respect to quality of recovery, robustness against erasures, and resource savings. There are many known systematic and heuristic procedures for determining M and $\delta_{2K}$ for a joint two-dimensional compressive sensing problem. Depending on the implementation, the choice is specific to the statistics of the sensed RF features. Additionally, for a given RIP criterion and a desired compression ratio, M/N, if N is large enough, one may compute multiple measurement matrices that can perform the compressive sensing task.

Figure 3:
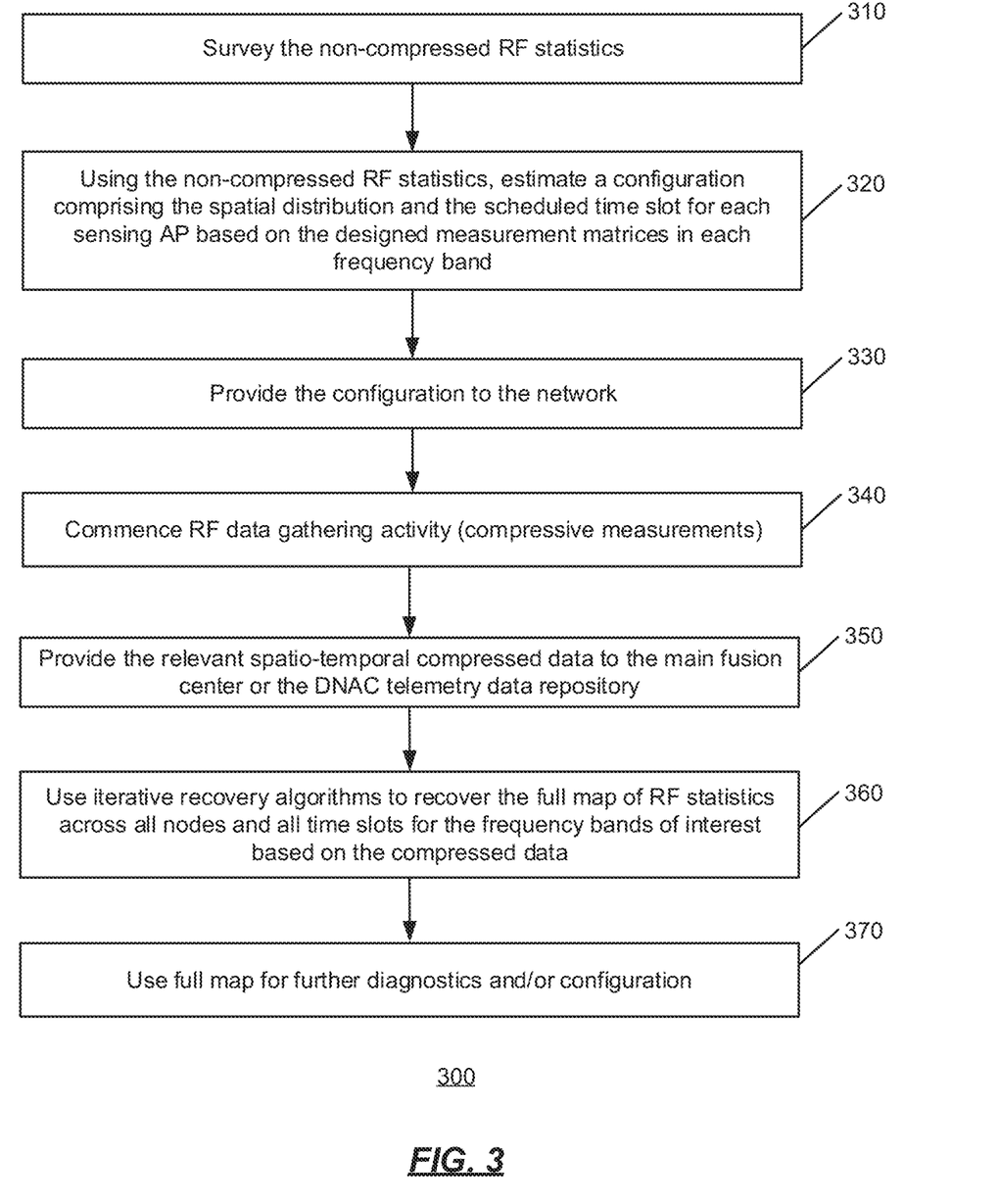
FIG. 3 is an operational flow of an implementation of a method of multiband compressive sensing.

FIG. 3 is an operational flow of an implementation of a method 300 of multiband compressive sensing. In some implementations, the method 300 may be performed by the management entity 110.

At 310, the non-compressed RF statistics of the network are surveyed, e.g. by the data monitor 112 of the management entity 110. The RF statistics may be gathered and stored in storage, such as the data repository 114 of the management entity 110.

At 320, a configuration is estimated using the RF statistics. The estimated configuration comprises the spatial distribution and the scheduled time slot for each sensing AP and is based on the designed measurement matrix (i.e., the compressive sensing schedule) for each frequency band. At 330, the configuration is provided to the network, e.g., by the management entity 110.

At 340, the management entity 110 commences RF data gathering activity from the network using the compressive measurements according to the appropriate compressive sensing schedule for each frequency band.

At 350, the gathered data, such as the spatio-temporal compressed data, is provided to a fusion center (such as the fusion center 120) or other data repository, such as a DNAC telemetry data repository.

At 360, using iterative recovery algorithms, the full map of RF statistics is recovered across all nodes and all time slots for all the frequency bands of interest, based on the compressed data from 350. At 370, the full map of RF statistics may be used for further diagnostics and/or configuration.

Figure 4:
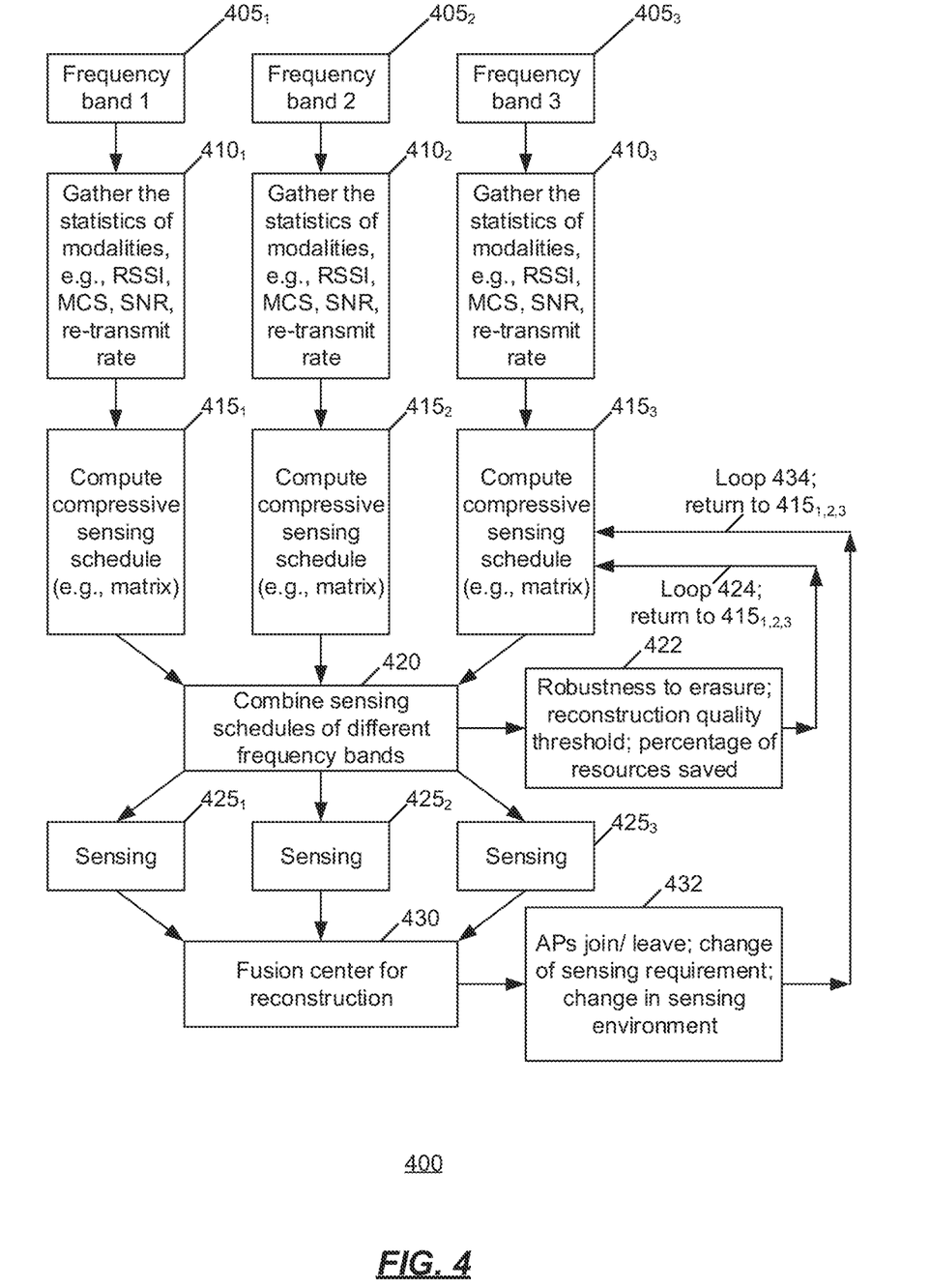
FIG. 4 is an operational flow of an implementation of a method of multiband compressive sensing.

FIG. 4 is an operational flow of an implementation of a method 400 of multiband compressive sensing. At 405, a plurality of frequency bands are separately monitored. Although three frequency bands (i.e., frequency bands 1, 2, and 3) are shown as monitored at $405_1$, $405_2$, and $405_3$, respectively, this is not intended to be limiting as any number of frequency bands may be monitored.

At 410 (e.g., 410₁, 410₂, and 410₃), baseline monitoring of the wireless environment is performed. The statistics of modalities are gathered for each of the frequency bands 1, 2, and 3. The statistics may include any transmission medium or transceiver (transmitter-receiver) related metric(s) of interest such as, for example, RSSI, MCS, SNR, and re-transmit rate. With this information, a 2D matrix (space and time) can be created and used to determine which sensors to monitor.

At 415 (e.g., 415₁, 415₂, and 415₃), a compressive sensing schedule (e.g., in the form of a matrix) is generated for each of the frequency bands 1, 2, and 3. Any type of compressive sensing schedule or matrix generation technique may be used, such as Kronecker or distributed, for example, and the generation may be performed by the compressive sensing schedule generator 116.

At 420, the compressive sensing schedules (e.g., matrices) from 415 are combined into a resulting schedule, in the form of a matrix for example. The sensing matrix combiner 118 may perform the combining. The resulting matrix is a schedule that comprises a spatial distribution as well as the scheduled time slot for each sensing AP (e.g., the transceiver of each AP), which are based on the computed compressive sensing schedules (measurement matrices) in each frequency band from 415 (which were computed using the non-compressed RF statistics by the management entity 110, for example).

The resulting matrix includes the frequency band(s) of scan, time(s) of scan, and the node(s) configured to scan, and this information is communicated to the network by the management entity for sensing at 425. Thus, the resulting matrix is used for sensing in each of the frequency bands 1, 2, and 3, at 425 (e.g., 425₁, 425₂, and 425₃). The resulting matrix may also be used, at 422, to determine data directed to robustness to erasure, a reconstruction quality threshold, and/or a percentage of resources saved, for example. Such data may be provided in a loop 424 back to 415 (e.g., 415₁, 415₂, and 415₃) to again generate a compressive sensing schedule for each of the frequency bands 1, 2, and 3. The loop 424 is used to construct the 2D matrix, which is the sensing schedule.

More particularly, regarding the loop 424, during the compressive sensing schedule (i.e., measurement matrix) composition process, when a desired combination is determined that cannot be computed per the needs of the management entity, the requirements (e.g., robustness to erasure, reconstruction quality, and percentage of resources saved (all are related to compression ratio)) may be altered, and the per-band schedules/measurement matrices may be recomputed at 415, and the composition process may be repeated at 420 until a desired combination is determined that can be computed per the needs of the management entity.

At this point, at 425, the RF data gathering activity (RF statistics by way of compressive measurements) commences, and the relevant spatio-temporal compressed data is communicated and provided to the main fusion center or the DNAC telemetry data repository. At this point, at 430, iterative recovery algorithms may be utilized to recover the full map of RF statistics (data) across all nodes and all time slots for all the interested frequency bands based on the available compressed telemetry log. Any recovery algorithm may be used, such as published variants of OMP (orthogonal matching pursuit) which are well studied in the compressive sensing literature. The data can then be used by the management entity or other agents for DNAC for further diagnostic and configuration at 432.

Thus, at 430, the results of the sensing from each of the frequency bands are used to reconstruct the telemetry data. With the reconstructed telemetry data, various actions or events on the network may be instituted at 432, such as one or more APs may join or leave the network, sensing requirements may be changed, sensing environments may be changed, etc.

From 432, processing may continue with a loop 434 back to 415 (e.g., 415₁, 415₂, and 415₃). The loop 434 may be considered a sensing loop in that the processing continues with the further computation of compressive sensing schedules (matrices) using data captured from subsequent frequency band captures. Thus, regarding the loop 434, the computation of schedules, measurements, and corresponding combinations may be refreshed or updated if several events take place, such as (a) APs join/leave, (b) a change of sensing requirements, or (c) a change in the sensing environment at 432.

Thus, a two-step optimization is provided. For each frequency band of interest, at 415, compute multiple compressive sensing schedules (e.g., measurement matrices) (per the loop 424), based on a requirement such as reconstruction quality, resource savings (compression ratio), and robustness to erasure using a well known 2D compressive sensing algorithm depending on the implementation. At 420, select one compressive sensing schedule (measurement matrix) for each band and combine them together, based on system requirements, such as preference for resource saving or erasure avoidance. There are multiple algorithms that can be used to select the suitable compressive sensing schedules, such as greedy algorithm or exhaustive search.

Figure 5:
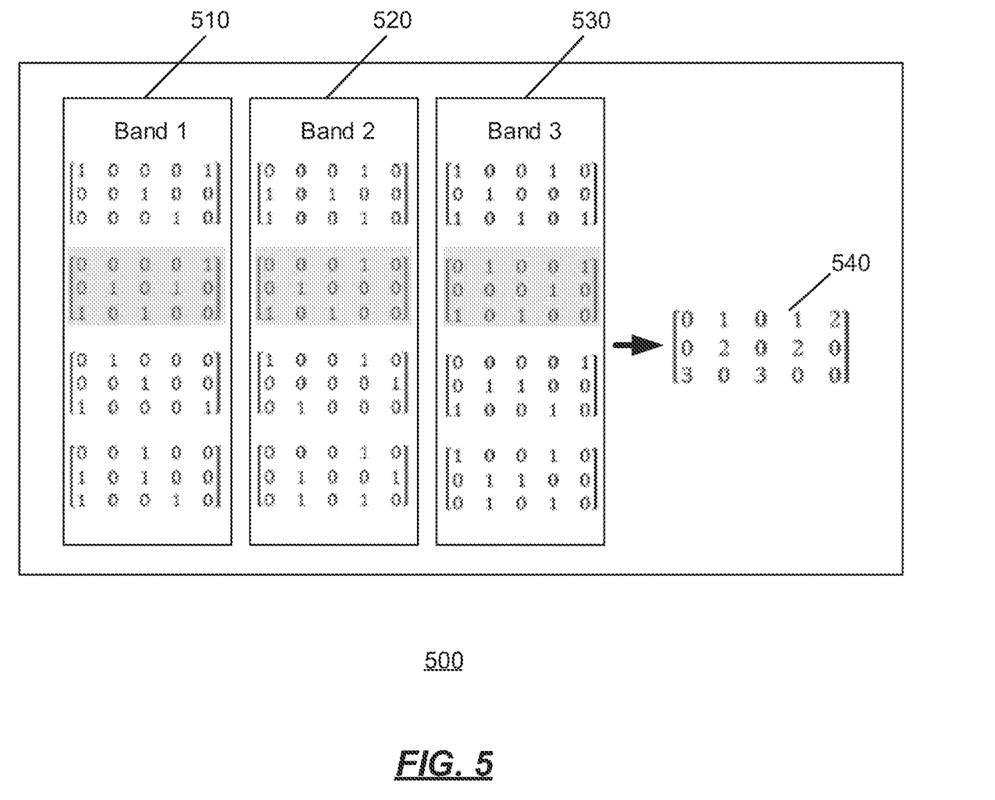
FIG. 5 is an illustration of an example of combining the schedules and measurements of three different frequency bands.

As noted above, at 420, the compressive sensing schedules, e.g. in the form of matrices, are combined into a resulting matrix. An embodiment directed to combining the matrices of the compressive sensing schedules is described. For 420, there are two different embodiments as to how to combine the compressive sensing schedule matrices of different bands. One embodiment of the combining is described with respect to FIG. 5. FIG. 5 is an illustration of an example of combining the schedules and measurements of three different frequency bands using a resource saving oriented implementation.

In illustration 500, each row in the initial matrices 510, 520, 530 (which correspond to frequency bands 1, 2, and 3, respectively, such as the three frequency bands monitored at 405₁, 405₂, and 405₃, respectively, in FIG. 4), as well as each row in the resulting matrix 540, is an AP, and each column in the matrices 510, 520, 530, 540 is a time slot. A "1" in a matrix means to activate the AP to do wireless monitoring, and a "0" in a matrix means to not use the AP to do monitoring (e.g., because it is for transmitting, or any other reason(s)).

The shaded portions of the initial matrices 510, 520, 530 are the sensing schedules that are selected. They are directly added together to get the resulting matrix 540. This resulting matrix, where the "1"s are, indicates that the AP is required to be activated in a particular frequency at a particular time slot. The "2" in the resulting matrix 540 means that two frequency bands need to be sent in that time slot. This takes a lot of resources. The resulting matrix 540 will lead to a lot of erasures because of all the "2"s.

Thus, in FIG. 5, each of the 3-by-5 matrices 510, 520, 530 represents the scheduling/measurement regiment for joint spatio-temporal compressive sensing for one frequency band, with rows being the AP number and columns being the time slots. "1" means that the AP is on in the corresponding band, while "0" means that the AP is off. After step 415 of FIG. 4, each frequency band now has multiple sensing schedules (the four matrices shown in each of the 3-by-5 matrices 510, 520, 530). These matrices may be obtained using the two aforementioned schemes (Kronecker and distributed) while satisfying a particular RIP constraint. As mentioned earlier, for a given RIP criterion and a desired compression ratio, M/N, if N is large enough, one may compute multiple measurement matrices that can perform the compressive sensing task. The next step is to come up with a composite matrix for all bands which can be done in different ways (the selected schedule is shaded in FIG. 5). A consideration is that each AP can only be used in each time slot for only one frequency band. Therefore, if there are multiple schedules that require the same AP to be in different bands for one time slot (element of the matrix 540 larger than 1), only one band can be selected for the AP to make a measurement for. In such a case, where one or multiple conflicts exist, one could skip scheduled measurements by the AP in all bands but one, in that time slot, and consider the associated measurement/sample in the missed bands as erasures (impulse noise or outliers are known to corrupt a compressive sensing measurements in such a fashion). Accordingly, a resource saving technique may be considered.

Figure 6:
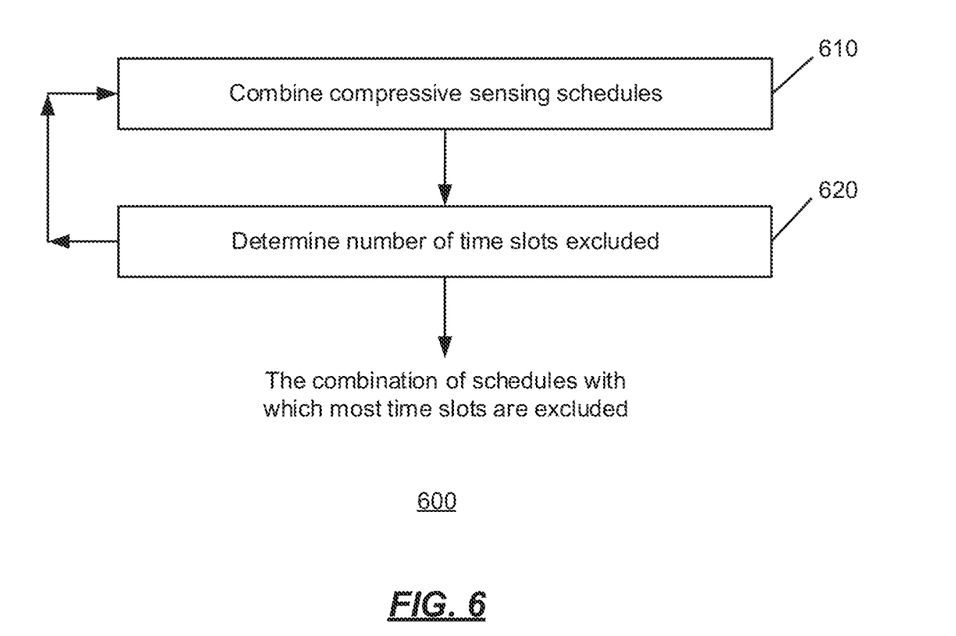
FIG. 6 is an operational flow of an implementation of a method of multiband compressive sensing using resource saving.

FIG. 6 is an operational flow of an implementation of a method 600 of multiband compressive sensing using resource saving. With a resource saving technique, a combination is determined that uses the fewest resources.

At 610, the compressive sensing schedules are combined in a combination. At 620, the number of time slots that will be excluded in the combination from 610 is determined. Processing continues at 610 with the compressive sensing schedules being combined in another combination. Processing continues until the compressive sensing schedules have been combined in each of the different combinations. At this point, the combination of compressive sensing schedules with the most time slots that will be excluded is selected and subsequently used.

In this manner, the combination of compressive sensing schedules is selected with which most time slots are excluded for spectrum sensing (and thus can be used for other purposes like serving clients). Because recovery algorithms generally have certain tolerance to data erasure, it ensures the full map of RF telemetry can be reconstructed at the fusion center/DNAC, though with slightly lower confidence and/or higher convergence time of the iterative OMP algorithm.

Figure 7:
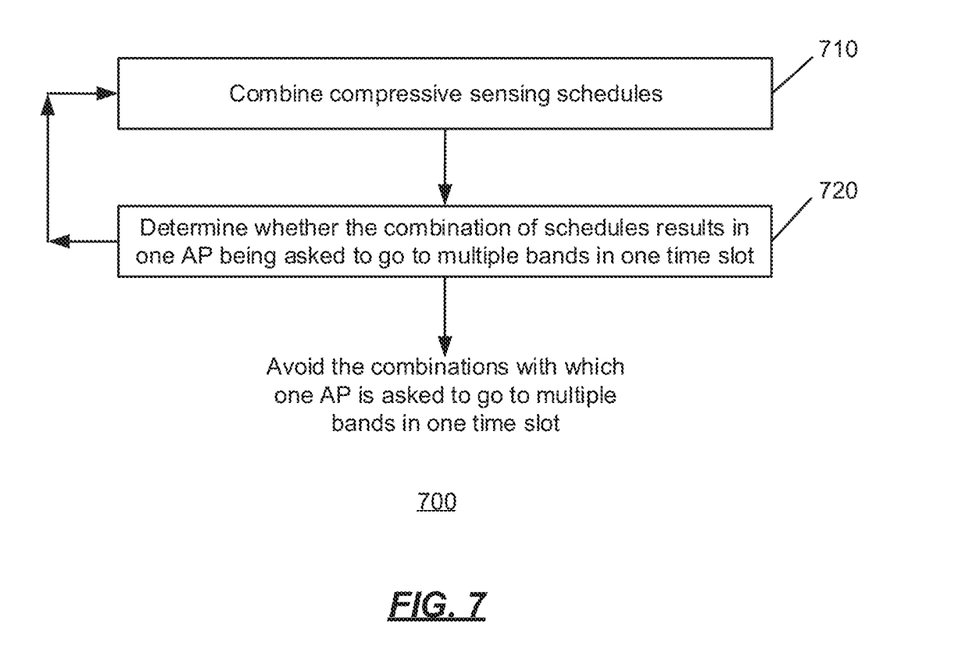
FIG. 7 is an operational flow of an implementation of a method of multiband compressive sensing using erasure avoidance.

In another implementation, an erasure avoidance technique may be used with multiband compressive sensing to select a composite measurement matrix. FIG. 7 is an operational flow of an implementation of a method 700 of multiband compressive sensing using erasure avoidance.

At 710, the compressive sensing schedules are combined in a combination. At 720, it is determined whether the combination of compressive sensing schedules results in an AP having to go to multiple bands in one time slot. Processing continues at 710 with the compressive sensing schedules being combined in another combination. Processing continues until compressive sensing schedules have been combined in each of the different combinations. At this point, the combination of compressive sensing schedules with which an AP has to go to multiple bands in one time slot will be excluded and not used. Any of the remaining (i.e., non-excluded) combinations may be subsequently be used. In an implementation, the least overlapping combination of compressive sensing schedules may be selected for use.

Figure 8:
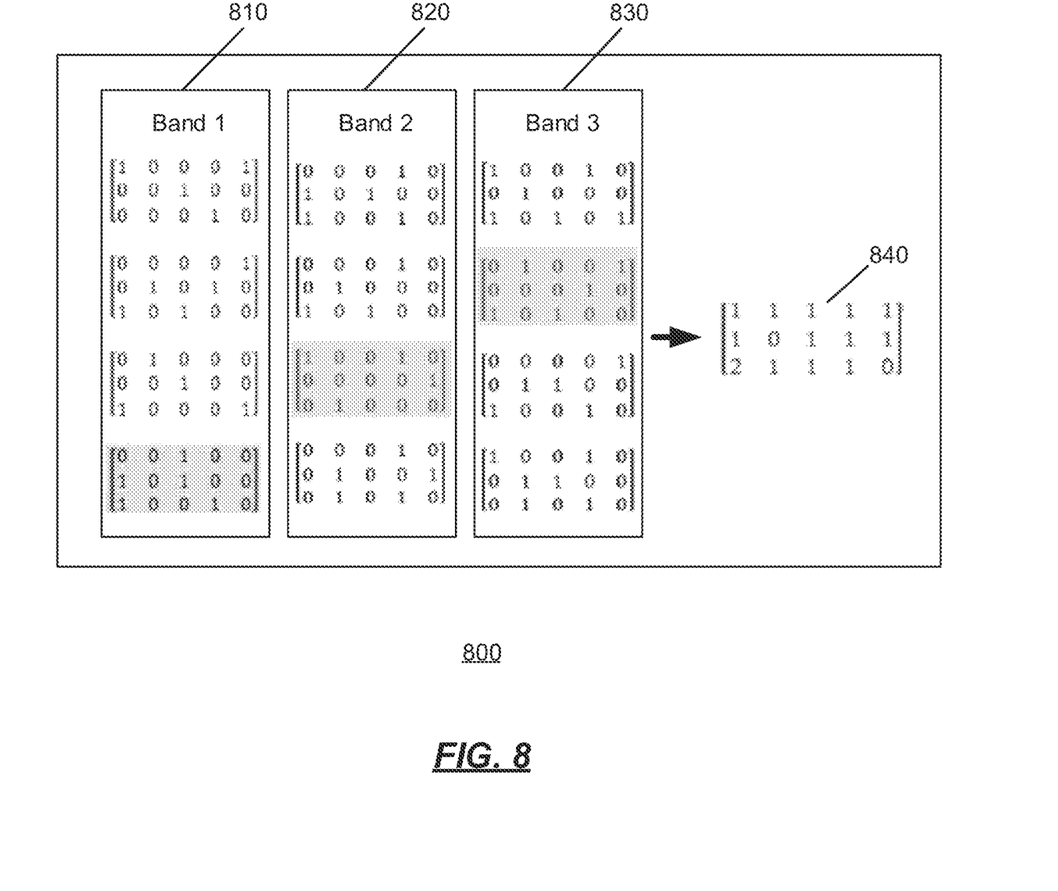
FIG. 8 is an illustration of another example of combining the schedules and measurements of three different frequency bands.

FIG. 8 is an illustration of an example 800 of combining the compressive sensing schedules and measurements of three different frequency bands using erasure avoidance. Here, similar to FIG. 5, each of the 3-by-5 matrices 810, 820, 830 (the initial matrices) represents the scheduling/measurement regiment for joint spatio-temporal compressive sensing for one frequency band, with rows being the AP number and columns being the time slots. The resulting matrix 840 show a "2" which means that one AP to be on at two different bands at the same time, but this is not possible, so a vacancy is created here. The "2" is erased, so this method is called erasure avoidance.

In some implementations, aspects of the two embodiments, resource saving and erasure avoidance, can be combined in the selection of a composite measurement matrix.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An apparatus comprising:
    a compressive sensing schedule generator configured to generate a plurality of compressive sensing schedules, wherein each of the plurality of compressive sensing schedules is for each of a plurality of frequency bands of a network, wherein the network comprises a plurality of access points and a plurality of clients; and
    a sensing matrix combiner configured to combine the plurality of compressive sensing schedules into a resulting schedule that comprises a spatial distribution and a scheduled time slot for each of the plurality of access points, wherein the sensing matrix combiner is configured to combine the plurality of compressive sensing schedules into the resulting schedule using erasure avoidance.

2. The apparatus of claim 1, wherein each of the plurality of compressive sensing schedules is a matrix, and wherein the resulting schedule is a resulting matrix.

3. The apparatus of claim 2, wherein the resulting matrix comprises a frequency band of scan, a time of scan, and a plurality of nodes to scan.

4. The apparatus of claim 1, wherein the compressive sensing schedule generator is configured to generate the plurality of compressive sensing schedules using a spatio-temporal two-dimensional compressive sensing technique.

5. The apparatus of claim 1, wherein the compressive sensing schedule generator is configured to generate the plurality of compressive sensing schedules using radio frequency (RF) statistics gathered from the network.

6. The apparatus of claim 5, further comprising a data monitor that gathers the RF statistics from the plurality of frequency bands on the network.

7. The apparatus of claim 6, further comprising a data repository that receives the gathered RF statistics from the data monitor and stores the gathered RF statistics, and is configured to provide the RF statistics to the compressive sensing schedule generator.

8. The apparatus of claim 5, wherein the RF statistics comprise at least one transmission medium or transceiver related metric of interest within each of the plurality of frequency bands.

9. The apparatus of claim 1, wherein the sensing matrix combiner is configured to combine the plurality of compressive sensing schedules into the resulting schedule using resource saving.

10. A method comprising
    generating, at a compressive sensing schedule generator of a management entity, a plurality of compressive sensing schedules, wherein each of the plurality of compressive sensing schedules is for each of a plurality of frequency bands of a network, wherein the network comprises a plurality of access points and a plurality of clients;
    combining, at a sensing matrix combiner of the management entity, the plurality of compressive sensing schedules into a resulting schedule that comprises a spatial distribution and a scheduled time slot for each of the plurality of access points, wherein the combining the plurality of compressive sensing schedules into the resulting schedule uses erasure avoidance; and
    gathering, by the management entity, a plurality of radio frequency (RF) statistics from the network using the resulting schedule.

11. The method of claim 10, further comprising gathering data comprising at least one transmission medium or transceiver related metric of interest within each of the plurality of frequency bands, wherein the plurality of compressive sensing schedules is generated using the gathered data.

12. The method of claim 10, wherein each of the plurality of compressive sensing schedules is a matrix, and wherein the resulting schedule is a resulting matrix that comprises a frequency band of scan, a time of scan, and a plurality of nodes to scan.

13. A method comprising:
generating, at a compressive sensing schedule generator of a management entity, a plurality of compressive sensing schedules, wherein each of the plurality of compressive sensing schedules is for each of a plurality of frequency bands of a network, wherein the network comprises a plurality of access points and a plurality of clients;
combining, at a sensing matrix combiner of the management entity, the plurality of compressive sensing schedules into a resulting schedule that comprises a spatial distribution and a scheduled time slot for each of the plurality of access points;
gathering, by the management entity, a plurality of radio frequency (RF) statistics from the network using the resulting schedule; and
determining, for the resulting schedule, a robustness to erasure, a reconstruction quality, and a percentage of resources saved.

14. The method of claim 13, further comprising repeating the generating and combining based on the robustness to erasure, the reconstruction quality, and the percentage of resources saved.

15. The method of claim 13, wherein the combining the plurality of compressive sensing schedules into the resulting schedule uses erasure avoidance.

* * * * *